United States Patent Office 2,963,524
Patented Dec. 6, 1960

2,963,524

METHOD OF MAKING 1,3,5-HEXATRIENE

James M. Shackelford and Louis H. Schwartzman, Pittsburgh, Pa., assignors to Koppers Company, Inc., a corporation of Delaware No Drawing. Filed Feb. 16, 1959, Ser. No. 793,299

8 Claims. (Cl. 260—682)

This invention relates to a method of making 1,3,5-hexatriene. In one specific aspect, it relates to a novel catalytic dehydration of 1,4-hexadiene-3-ol to give 1,3,5-hexatriene in yields greater than those obtainable by prior art methods.

1,3,5-hexatriene polymerizes readily to give a high melting polymer. It can be combined with styrene and/or butadiene to form heat resistant polymers of high impact strength. Because of the considerable commercial potential of high impact polymeric materials made from 1,3,5-hexatriene, a need exists for a method of making this useful compound from the least expensive of the hexadiene-ols, viz: 1,4-hexadiene-3-ol.

Heretofore, 1,3,5-hexatriene has never been successfully prepared by the dehydration of 1,4-hexadiene-3-ol. In the past, certain of the isomeric hexadiene-ols have been dehydrated to give 1,3,5-hexatriene in yields which are relatively low when considered from a commercial standpoint. For example, Woods and Schwartzman, J. Am. Chem. Soc., 70, 3394 (1948), reported the dehydration of 1,3-hexadiene-5-ol in the presence of alumina at a temperature of 325–350° C. under reduced pressure (1.0 mm.) to give a 64% yield of 1,3,5-hexatriene.

The preparation of 1,3,5-hexatriene from 1,3-hexadiene-5-ol involves only a simple dehydration, since the hydroxyl group is adjacent to a carbon atom containing a removable hydrogen atom. Thus, the splitting off of water results in the direct formation of the conjugated triene, 1,3,5-hexatriene. The dehydration of 1,4-hexadiene-3-ol presents an altogether different problem. In the case of this particular carbinol, both of the carbon atoms adjacent to the carbon atom containing the hydroxyl group are doubly bonded to adjacent carbon atoms (i.e. vinyl groups flank the carbinol). Thus, 1,3,5-hexatriene can only be produced from this hexadiene-ol by a molecular rearrangement of the diene-ol coupled with a dehydration. Prior attempts to accomplish this rearrangement-dehydration of 1,4-hexadiene-3-ol to 1,3,5-hexatriene have been unsuccessful. Prevost, Bull. Soc. Chim., 1409 (1955), attempted to make 1,3,5-hexatriene by passing the 1,4-hexadiene-3-ol over alumina at 300° C. He obtained cyclohexadiene in almost quantitative yields as his only identifiable product.

1,4-hexadiene-3-ol is preferable to the other hexadieneols as a starting material, since it can be readily synthesized from raw materials which are commercially available and lower in cost than those required for the preparation of the other hexadiene-ols. 1,4-hexadiene-3-ol is made in excellent yield by the reduction of 4-hexene-1-yne-3-ol in the presence of a palladium on calcium carbonate catalyst containing lead acetate. The 4-hexene-1-yne-3-ol is made by the well-known reaction of sodium acetylide and crotonaldehyde. Quite surprisingly, we have found a novel method of accomplishing simultaneously the necessary rearrangement-dehydration of 1,4-hexadiene-3-ol to give 1,3,5-hexatriene in yields greater than those obtainable by any prior art method.

It is, therefore, an object of the invention to provide a novel method of making 1,3,5-hexatriene from 1,4-hexadiene-3-ol in yields as high as 90–95%.

In accordance with the invention, 1,4-hexadiene-3-ol is contacted in the vapor phase with a dehydration catalyst comprising a major portion of either silica or alumina and having a surface area of about 50–150 square meters per gram. The rearrangement-dehydration is accomplished simultaneously using a reaction temperature of about 225–350° C. and a pressure ranging from a reduced pressure of one millimeter of mercury to atmospheric pressure. Contact between the vapors of 1,4-hexadiene-3-ol and the catalytic material is maintained for not more than about 4 seconds. The vapors are condensed and the product 1,3,5-hexatriene, boiling at 79–80° C., is recovered therefrom in substantially pure form. Further purification, if desired, can be effected by recrystallization. Any unreacted carbinol can be recycled and combined with the feedstock for subsequent dehydration.

The method of the invention depends upon the careful control of such variables as catalyst activity, temperature, pressure and contact time. Catalyst activity is controlled primarily by the surface area of the particular catalyst used, although it is affected to some extent by the chemical composition of the catalyst. When catalysts having a higher activity are used, lower temperatures and shorter contact times provide the best yields of 1,3,5-hexatriene. The contact time selected is influenced measurably by temperature and pressure, as well as by catalyst activity. Generally speaking, higher temperatures of dehydration require a shorter contact time. At atmospheric pressure the required contact time is greater than that required when reduced pressures are used.

The choice of a catalyst for purposes of the invention is predicated on the activity of the particular catalyst selected. As we have already noted, the activity of the catalyst is influenced to a greater degree by the surface area thereof than by its chemical composition. Suitable catalysts comprise a major portion (at least 50% by weight) of either silica or alumina. Thus, the catalyst may be activated alumina, silica-alumina or any one of a number of naturally occurring siliceous or aluminous materials commonly employed as dehydration catalysts. The so-called "promoted" dehydration catalysts which comprise a silica, silica-alumina or alumina base and a minor portion (0.5 to 10% by weight) of a metal oxide, such as the oxides of thorium, iron, zinc, chromium, barium, copper, nickel, and cesium, are useful in the invention. The silica, silica-alumina or alumina catalyst body may also be promoted with various phosphates and borates.

The catalyst may be used in either pelleted or granular form and the particle size thereof is not particularly critical. We have found it convenient to use pellets having a diameter ranging between $\frac{1}{16}$ inch and $\frac{1}{4}$ inch or granules having a particle size of 2–20 mesh (U.S. Sieves).

We have discovered that, using the catalytic materials described hereabove, we can control the catalyst activity to the required extent by regulating the surface area of the particular dehydration catalyst selected. If the surface area of the catalyst used exceeds about 150 square meters per gram, such a catalyst is too active and the yields of 1,3,5-hexatriene obtainable are markedly diminished. The high yields of the invention are obtained using a catalyst having a surface area of about 50–150 square meters per gram. A catalyst having a surface area of about 80 to 100 square meters per gram is preferred.

The reaction temperature can vary widely. A minimum temperature of about 225° C. is required to promote effective rearrangement-dehydration. Above about 350° C. only low yields of the desired product are obtained. As we have already pointed out, when more active catalysts are used, it is desirable to operate in the lower portion of the permissible temperature range. This is also true when longer contact times are employed. Preferred temperatures for the method of the invention range between about 290 and 300° C.

The control of pressure for purposes of the invention is less important than the control of the other variables. The process can be conducted effectively at atmospheric pressure or at reduced pressures as low as 1 mm. of mercury. We have found it convenient, although not necessary, to conduct the reaction in an inert atmosphere such as nitrogen.

Control of the contact time is of particular importance. If the contact time between the catalyst and the vapors of the 1,4-hexadiene-3-ol is extended beyond about 4 seconds, the yield of 1,3,5-hexatriene begins to decrease markedly. Using a contact time of 25 seconds with an active catalyst no 1,3,5-hexatriene is recovered as a product. At atmospheric pressure the preferred contact time ranges between about 1.5–3.0 seconds. Under reduced pressures a contact time of 0.05–0.25 seconds is preferred, although longer contact times (1–2 seconds) can be used with only a very slight reduction in yield. Contact time is conveniently controlled by the physical arrangement of the catalyst bed. We prefer to use a vertical bed and either pass the feed vapors downwardly through the bed or alternatively, draw the vapors upwardly through the bed using reduced pressures. Using a vertical fixed bed, the contact time can be directly controlled by the bed thickness and feed rate.

Our invention is further illustrated by the following examples.

EXAMPLE I

A Pyrex glass tube (29 mm. I.D.) was packed with alumina (⅛ inch pellets) for a length of six inches. A preheat zone of five inches of glass beads was used and a thermocouple well (4 mm. O.D.) was placed in the center of the tube. The tube was externally heated to 290–300° C. and the system was excited through a Dry Ice trap and a vacuum pump to maintain the desired pressure (5–100 mm.).

1,4-hexadiene-3-ol (49 g., 0.5 m.) was distilled into the reactor over a period of 40 minutes at a pressure of 30 mm. This was calculated to give a contact time in the range of 0.05–0.25 second. The vapors were condensed and the water (8.8 g.), 1,3,5-hexatriene (35.8 g.) and unreacted carbinol (2.2 g.) were separated. The hydrocarbon fraction was analyzed by means of gas chromatography and found to contain 92 mole percent 1,3,5-hexatriene, 4 mole percent 1,3-cyclohexadiene, 2 mole percent benzene and traces of other hydrocarbons. The ultimate yield of pure 1,3,5-hexatriene was 86%. The physical properties of pure 1,3,5-hexatriene are B.P. 79.6–80.0° C./760 mm., F.P. −8.06° C., $n_D^{22}$ 1.5088, e at 2565 A. 48,400.

EXAMPLE II

A Pyrex glass tube (29 mm. I.D.) was packed with a silica-alumina catalyst comprising 87% silica and 13% alumina (⅛ inch pellets) for a length of six inches. A preheat zone of five inches of glass beads was used and a thermocouple well (4 mm. O.D.) was placed in the center of the tube. The tube was externally heated to 250° C. and the system was excited through a Dry Ice trap and a vacuum pump to maintain the desired pressure (5–100 mm.).

1,4-hexadiene-3-ol (49 g., 0.5 m.) was distilled into the reactor over a period of 40 minutes at a pressure of 30 mm. This was calculated to give a contact time in the range of 0.05–0.25 second. The vapors were condensed and the water (8.5 g.), 1,3,5-hexatriene (33.2 g.) and unreacted carbinol (4.1 g.) were separated. The hydrocarbon fraction was analyzed by means of gas chromatography and found to contain 88 mole percent of 1,3,5-hexatriene, 5 mole percent of 1,3-cyclohexadiene, 3.5 mole percent of benzene and traces of other hydrocarbons. The ultimate yield of pure 1,3,5-hexatriene was 80%.

EXAMPLE III

Using the apparatus described in the previous examples, 1,4-hexadiene-3-ol (56.3 g.) was distilled into the reactor at 25 mm. The vapors were condensed and unreacted carbinol (12.2 g.), water (7.75 g.) and 1,3,5-hexatriene (35.4 g.) were separated. The hydrocarbon fraction was analyzed by means of mass spectrometry and found to contain 94 mole percent of 1,3,5-hexatriene. The ultimate yield of pure 1,3,5-hexatriene was 92%.

EXAMPLE IV

Using the apparatus described in the previous examples, 1,4-hexadiene-3-ol (49 g.) was pumped through the reactor at atmospheric pressure at such a rate as to give a contact time of 1.5 seconds. The vapors were condensed and unreacted carbinol (19.5 g.), water (5.0 g.) and 1,3,5-hexatriene (22.5 g.) were separated. The hydrocarbon fraction was analyzed by means of gas chromatography and found to contain 80 mole percent 1,3,5-hexatriene and various other hydrocarbons such as benzene and 1,3-cyclohexadiene. The ultimate yield of pure 1,3,5-hexatriene was 74.5%.

The recovered carbinol was analyzed and found to be identical with the starting 1,4-hexadiene-3-ol. Therefore, the rearrangement-dehydration reaction seems to be a concerted, rather than consecutive, process.

EXAMPLE V

Following the procedure of the previous examples, a series of runs was made to determine the influence of the critical process variables on the ultimate yield of pure product. The results are shown below in Table I.

*Table I*

PREPARATION OF 1,3,5=HEXATRIENE

| Run No. | Catalyst Composition | Catalyst Surface Area, sq. meters/g. | Reaction Temperature, °C. | Pressure, mm. of Hg | Contact Time, sec. | Yield, percent |
|---|---|---|---|---|---|---|
| 1 | 87% Silica—13% Alumina. | 150–170 | 300 | 760 | 24 | 11.7 |
| 2 | ----do------ | 150–170 | 300 | 30 | 0.4 | 64.8 |
| 3 | ----do------ | 270–300 | 300 | 760 | 25 | 0.0 |
| 4 | ----do------ | 270–300 | 300 | 760 | 5.6 | 15.9 |
| 5 | Alumina | 80–100 | 350 | 32 | 0.16 | 71.3 |
| 6 | ----do------ | 80–100 | 350 | 760 | 1.35 | 63.7 |
| 7 | ----do------ | 80–100 | 425 | 760 | 1.25 | 11.6 |
| 8 | ----do------ | 80–100 | 300 | 30 | 0.2 | 84.6 |
| 9 | ----do------ | 80–100 | 300 | 75 | 1.6 | 68.6 |
| 10 | ----do------ | 80–100 | 300 | 7.5 | 0.16 | 71.3 |

The data of Table I clearly show that when the critical limits of temperature, contact time and catalyst surface area are exceeded, only very low yields of 1,3,5-hexatriene can be obtained. Run 3 is especially noteworthy in that it shows that under adverse conditions of catalyst activity and contact time no 1,3,5-hexatriene is obtained.

We claim:

1. Method of making 1,3,5-hexatriene comprising contacting 1,4-hexadiene-3-ol with a dehydration catalyst comprising a major portion of a material selected from the group consisting of silica and alumina having a surface area of about 50–150 square meters per gram at a temperature of about 225–350° C. and at a pressure of about 1–760 mm. of mercury for not more than about 4 seconds.

2. Method of making 1,3,5-hexatriene comprising contacting 1,4-hexadiene-3-ol with an alumina dehydration catalyst having a surface area of about 50–150 square meters per gram at a temperature of about 275–350° C. and at a pressure of about 1–760 mm. of mercury for not more than about 4 seconds.

3. Method according to claim 2 wherein said temperature is 290–300° C.

4. Method according to claim 2 wherein the surface area of said catalyst is 80–100 square meters per gram.

5. Method of making 1,3,5-hexatriene comprising contacting 1,4-hexadiene-3-ol with a silica-alumina dehydration catalyst having a surface area of about 50–150 square meters per gram at a temperature of about 225–300° C. and at a pressure of about 1–760 mm. of mercury for not more than about 4 seconds.

6. Method of making 1,3,5-hexatriene comprising contacting 1,4-hexadiene-3-ol with an alumina dehydration catalyst having a surface area of about 50–150 square meters per gram at a temperature of about 225–350° C. for about 1–3 seconds.

7. Method of making 1,3,5-hexatriene comprising contacting 1,4-hexadiene-3-ol with an alumina dehydration catalyst having a surface area of about 50–150 square meters per gram at a temperature of about 225–350° C. and at a pressure of about 1–75 mm. of mercury for about 0.05–0.25 second.

8. Method of making 1,3,5-hexatriene comprising contacting 1,4-hexadiene-3-ol with a dehydration catalyst comprising a major portion of a material selected from the group consisting of silica and alumina having a surface area of about 80–100 square meters per gram at a temperature of about 290–300° C. and at a pressure of about 5–760 mm. of mercury for not more than about 4 seconds, condensing the hydrocarbon vapors thus formed and recovering substantially pure 1,3,5-hexatriene therefrom.

References Cited in the file of this patent

Butz: "Journal of American Chemical Society," volume 64, 1942, pages 1978–1979.

Woods et al.: "Journal of American Chemical Society," volume 77, 1955, pages 1800–1801.

Prevost et al.: Bull., Soc. Chimique de France, 1955, pages 1408–1410.